June 4, 1946.  J. G. MOHLER  2,401,653
SOD CUTTER
Filed Sept. 16, 1944   3 Sheets-Sheet 1
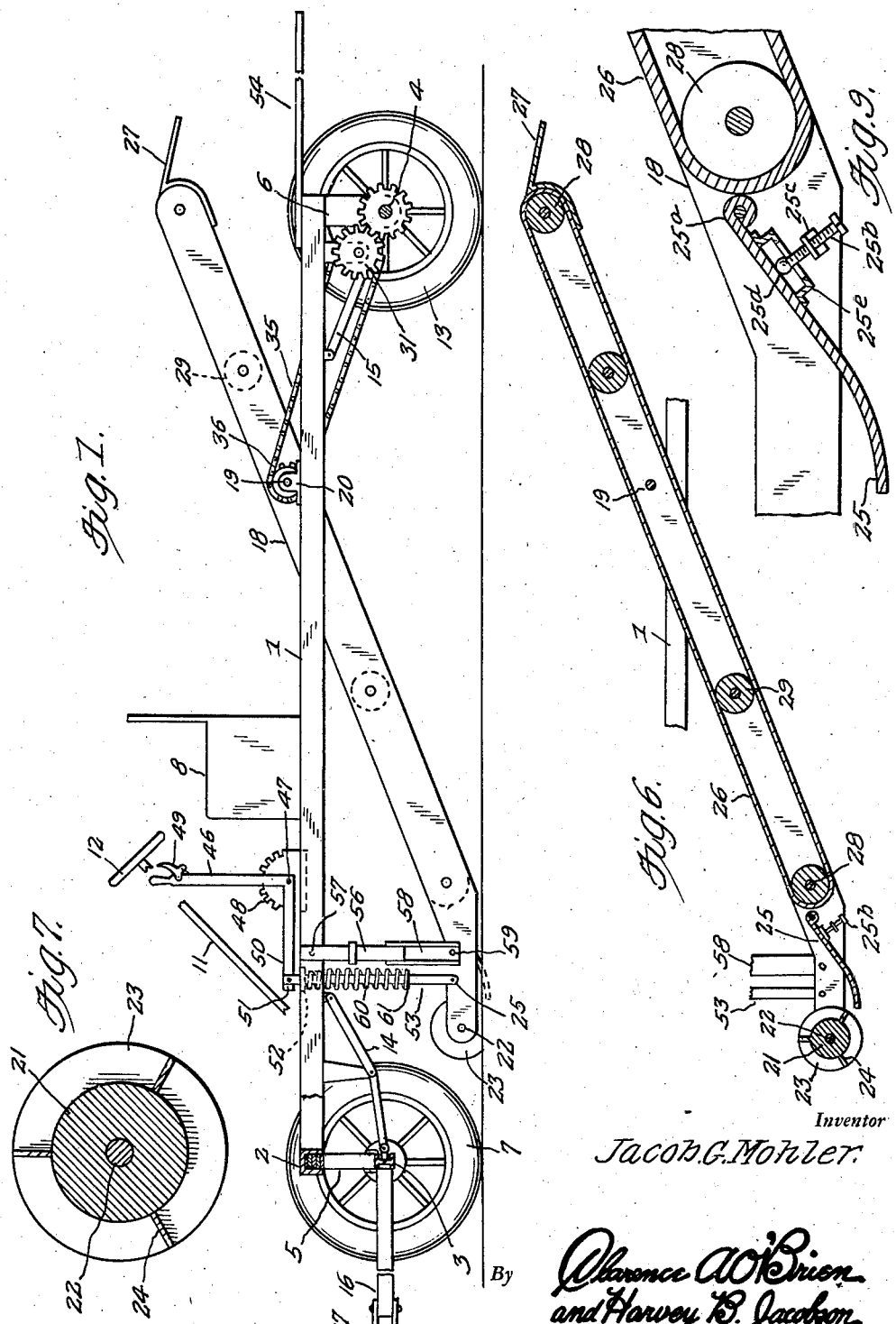
Inventor
Jacob G. Mohler
By Clarence A. O'Brien
and Harvey B. Jacobson
Attorneys June 4, 1946.  J. G. MOHLER  2,401,653
SOD CUTTER
Filed Sept. 16, 1944  3 Sheets-Sheet 2
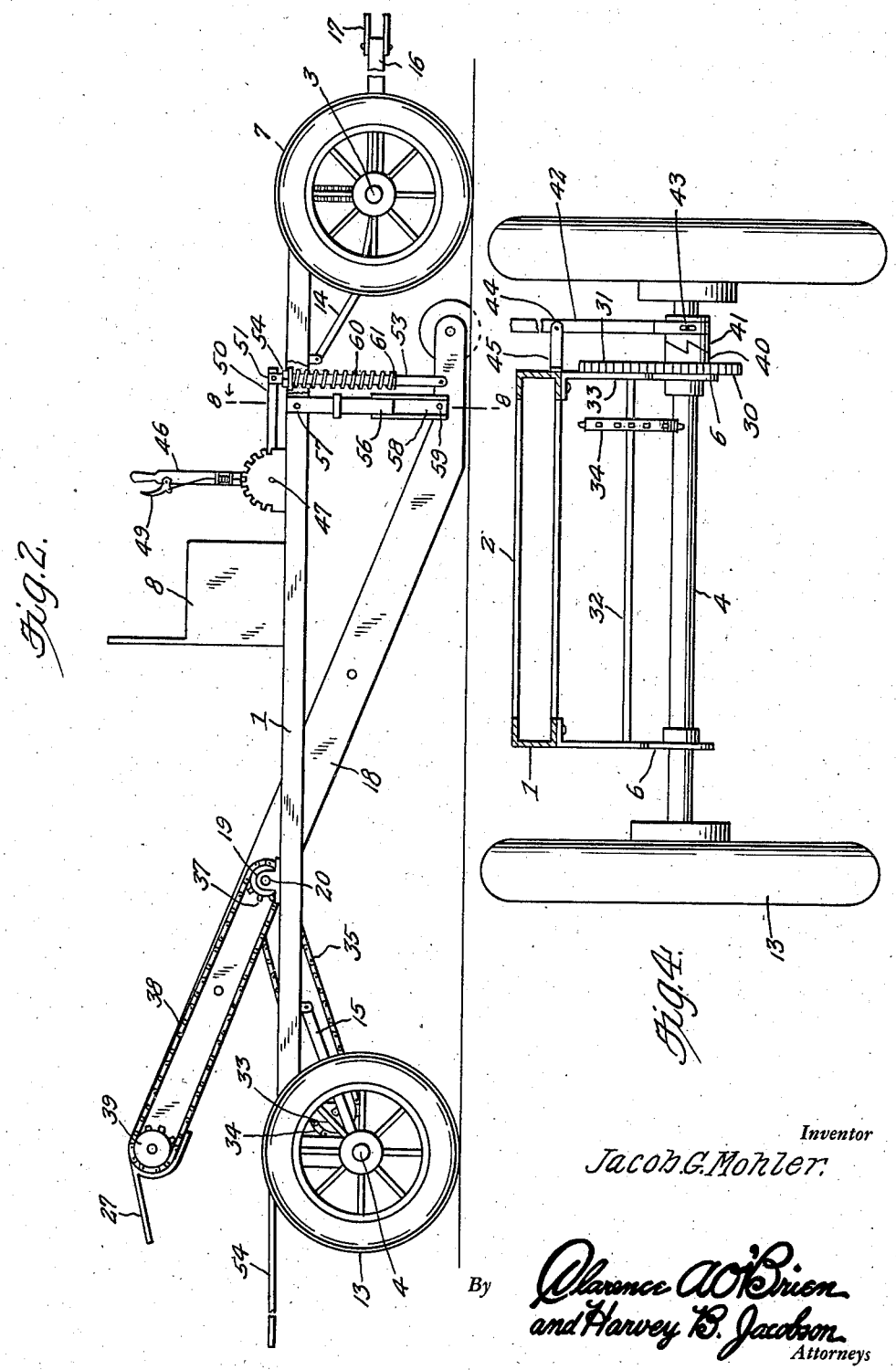
Inventor
Jacob G. Mohler.
By Clarence A. O'Brien
and Harvey B. Jacobson
Attorneys June 4, 1946.  J. G. MOHLER  2,401,653
SOD CUTTER
Filed Sept. 16, 1944  3 Sheets-Sheet 3
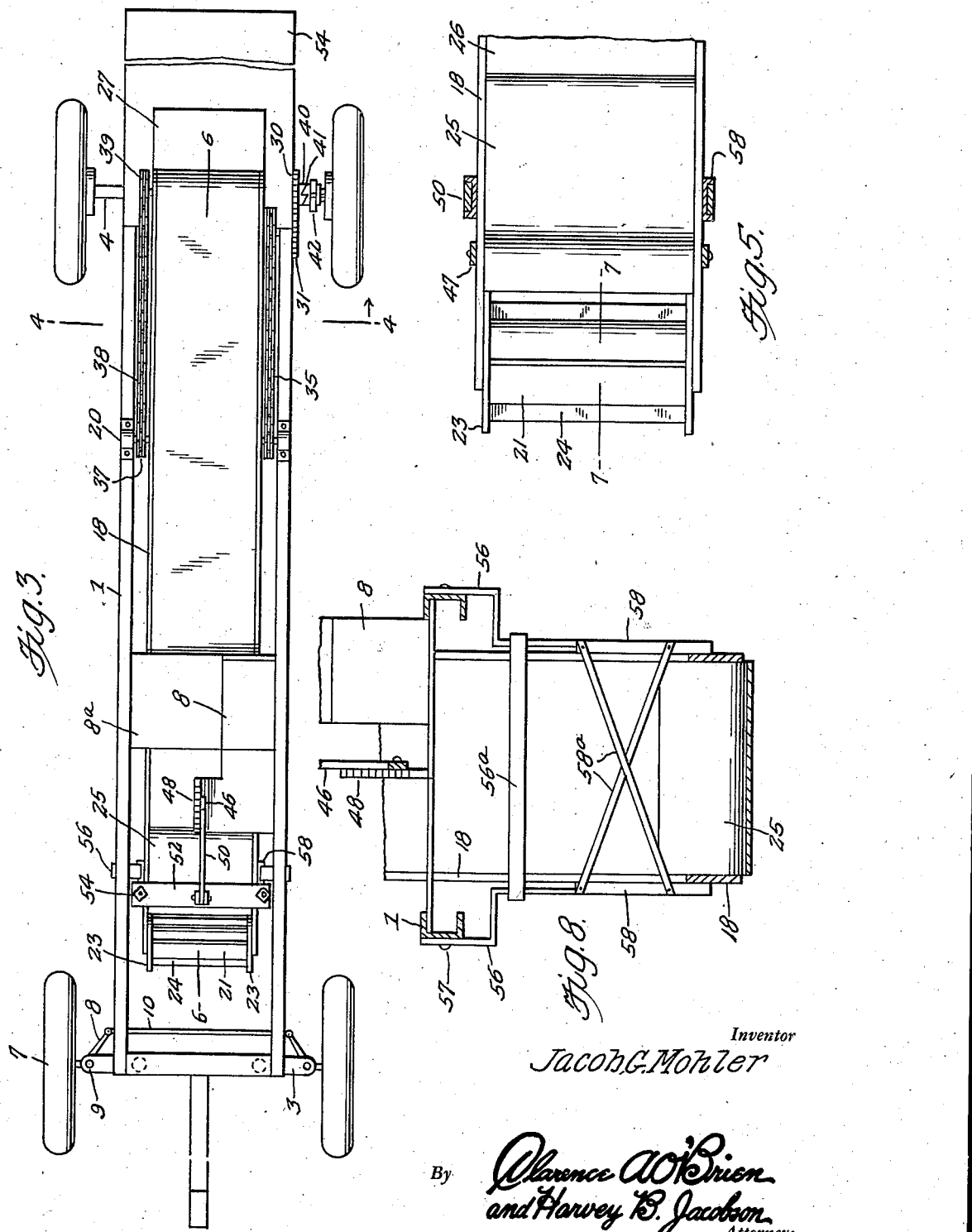
Inventor
Jacob G. Mohler
By Clarence A. O'Brien
and Harvey B. Jacobson
Attorneys Patented June 4, 1946

2,401,653

UNITED STATES PATENT OFFICE 2,401,653

SOD CUTTER

Jacob G. Mohler, Mohnton, Pa.

Application September 16, 1944, Serial No. 554,497

1 Claim. (Cl. 97—226)

My invention relates to improvements in sod cutters for cutting sod for lawns and the like, the primary object in view being to provide a simply constructed machine of few parts to be drawn over a field by a tractor or truck and which is operative under forward travel thereof to cut blocks of sod of uniform width, length and thickness quickly and without breaking up the sod, and to pick up and convey the cut sod to an unloading platform for disposal as required.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view in side elevation of my improved sod cutter in its preferred embodiment, viewed from one side of the machine, Figure 2 is a similar view looking at the opposite side of the machine, Figure 3 is a view in plan, Figure 4 is a view in transverse section taken on the line 4—4 of Figure 3 and drawn to an enlarged scale, Figure 5 is a fragmentary view in plan of the front end of the conveyor and the rotary cutter drawn to an enlarged scale, Figure 6 is a detail view in longitudinal section taken on the line 6—6 of Figure 3, Figure 7 is a view in transverse section taken on the line 7—7 of Figure 5 and drawn to a further enlarged scale, Figure 8 is a view in vertical transverse section taken on the line 8—8 of Figure 2 and drawn to an enlarged scale, and Figure 9 is a detail sectional view on an enlarged scale showing the mounting and adjustment for the combined scoop and cutter blade.

Referring to the drawings by numerals, the sod cutter of my invention comprises a main frame including channeled side bars 1 connected together at the ends thereof by cross bars, as at 2, and which is supported by front and rear axle bars 3, 4 through the medium of a transverse spring 5 between said frame and the front axle bar 3, and bearing arms 6 depending from the rear end of said frame and in which the rear axle bar 4 is suitably journaled. The front axle bar 3 is supported by front steering wheels 7 on steering arms 8 suitably pivoted, as at 9, to said bar for steering and connected by a cross rod 10 connected in the usual manner, not shown, to a steering post 11 provided with a steering wheel 12. The rear axle bar 4 is supported by rear ground wheels 13 one being fast thereon and the other loose in the usual manner. Front brace bars, as at 14, are provided between the front axle bar 3 and the side bars 1, and similar brace bars 15 between the rear axle bar 4 and said bars 1. A suitable draft tongue 16 extends from the front axle bar 3 with a hitch 17 thereon for coupling the tongue 16 to a draft vehicle, not shown. A driver's seat 8 is suitably secured on a platform 8a and extends across the main frame in the rear of the steering wheel 12.

A conveyor frame comprising laterally spaced parallel side bars 18 inclines downwardly and forwardly between the side bars 1 in the rear of the seat 8 with the rear ends of said bars 18 suitably spaced above the rear end of the main frame, and the front ends of said bars 18 terminating close to the front end of said main frame. The conveyor frame side bars 18 are mounted on the main frame for vertical swinging movement by means of a cross shaft 19 journaled at its ends in bearings 20 on the side bars 1 and extending through the side bars 18 adjacent the rear ends of the same. A rotary sod cutter is provided between the front ends of the side bars 18 and which comprises a roller 21 journaled on a cross shaft 22 suitably fixed in said ends and provided with circumferential end flanges 23 and radial cutting blades 24 spaced apart in 120° angular relation, the roller 21 being of a suitable diameter to roll along the surface of the ground. A combined scoop and cutterplate 25 extends crosswise between the side bars 18 in the rear of the rotary sod cutter and is suitably pivoted at its rear edge, as at 25a, to said bars 18 to incline upwardly and rearwardly from said rotary sod cutter and undercut sod over which said roller 21 travels. Set screws 25b extended through brackets 25c on the conveyor side bars 18 and having ball ends 25d slidably and rotatably fitted in suitable guides 25e on the cutter plate 25 provide for vertically adjusting said plate to cut at different depths. An endless conveyor 26 of the belt type extends between said side bars 18 from the combined scoop and cutter plate 25 to a discharge platform 27 suitably secured to the rear ends of the side bars 18 to receive sod discharged from the conveyor. The conveyor 26 further includes end rollers 28 and intermediate idler rollers 29 suitably journaled at the ends thereof in said side bars 18.

A drive from the rear axle bar 4 is provided for the conveyor 26 comprising a gear wheel 30 freely rotatable on said rear axle bar 4 for meshing with a driven gear wheel 31 fast on one end of the cross shaft 32 suitably journaled at its ends in hangers bars 33 depending from the side bars 1 of the main frame. A sprocket wheel 34 fast on the cross shaft 32 is connected by a sprocket chain 35 to a sprocket wheel 36 fast on the beforementioned shaft 19 adjacent one end of the latter. The shaft 19 is operatively connected at its other end to the roller 28 at the rear end of the conveyor by means of a sprocket wheel 37, sprocket chain 38 and sprocket wheel 39. The gear wheel 30 is provided with a clutch collar 40 complemental to a clutch collar 41 splined on the rear axle shaft 4 for shifting to engage and disengage the clutch collar 40. The clutch lever 42 is operatively connected to the clutch collar 41, as at 43, and pivoted, as at 44, to a bracket 45 on one side bar 1.

Forwardly of the seat 8, a hand lever 46 for swinging the front end of the described conveyor frame upwardly is pivoted, as at 47, alongside a detent segment on the platform 8a, the lever 46 being provided with the usual hand grip detent 49 for cooperation with the detent segment 48 in setting the lever 46 in different positions. The lever 46 includes a forwardly extending arm 50 pivoted, as at 51, to a cross bar 52 intermediate the ends of said bar. A pair of rods 53 with nuts 54 on the upper ends thereof are slidably extended through opposite ends of the cross bar 52 to depend alongside the side bars 18 of the conveyor frame to which the lower ends of said rods are pivoted, as at 55.

A pair of brace bars 56 are suitably pivoted at upper ends thereof, as at 57, to the side bars 1 to depend therefrom and to swing forwardly and rearwardly of the machine. A cross bar 56a connects said bars 56 to maintain the same parallel. A pair of channel bars 58 vertically slidable on said bars 56 are pivoted at their lower ends as at 59 to the side bars 18 of the conveyor frame adjacent their front ends whereby the conveyor frame is braced against lateral play but vertically swingable. The channel bars 58 are connected by diagonal cross members 58a. A pair of coil springs 60 interposed between fixed collar 61 on the rods 53, and the cross bar 52 provide for yielding movement of the front end of the described conveyor frame upwardly, in a manner which will be clear, when the machine is traveling over uneven ground.

Referring now to the operation of the described invention, the machine being pulled over the ground, the hand lever 46 is set to lower the side bars 18 of the conveyor frame so that the roller 21 of the rotary cutter will roll along the ground under forward travel of the machine. As said rotary cutter rides over the ground, the flanges 23 cut sod in the form of a strip of uniform width which is cut crosswise into uniform sized pieces by the cutting blades 24. The combined scoop and cutter plate 25, trailing the rotary cutter undercuts the pieces of sod and elevates the same to the front end of the conveyor 26, which is operated in the proper direction by the described drive from the rear axle shaft 4, to convey the pieces to the discharge or unloading platform 27 to be taken off of said platform by an operative standing on the rear end of the machine, as for instance on a platform 54. When the machine is not in use by setting the hand lever 40 in the proper direction, the front ends of the side bars 18 of the conveyor frame may be elevated to lift the rotary cutter out of the ground, together with the combined scoop and cutter plate 25. The machine may be steered by the described steering mechanism so that the rotary cutter will accurately cut sod in side-by-side strip formation.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a sod cutting machine, a wheel-supported main frame having rear ground wheels, a conveyor frame inclining downwardly and forwardly through said main frame and mounted therein for vertical swinging movement to lower and elevate the lower end of the same, an endless conveyor in said frame for conveying sod upwardly and rearwardly, a drive between one of said wheels and said conveyor, a rotary cutter mounted in the front end of the conveyor frame and adapted to be rolled over the ground by forward travel of the machine, said cutter embodying means for cutting sod in the line of travel of the machine and crosswise of said line, means carried by said conveyor frame for variably undercutting the sod at different depths upon forward travel of the machine after the same is cut by said rotary cutter and elevating the same to said conveyor, and manipulative means for swinging said front end of the conveyor frame to elevate and lower, respectively, said cutter, and the undercutting and elevating means, the means last mentioned providing for yielding upward movement of said front end of the conveyor frame relative thereto.

JACOB G. MOHLER.